United States Patent Office 3,562,253
Patented Feb. 9, 1971

3,562,253
1,4 - DIALKYL - 2,5 - PIPERAZINEDIONE - 3,6 - DI-THIOACETATES, -DITHIOLS, -DISULFIDES AND -TETRASULFIDES
Patrick Willoughby Trown, Suffern, N.Y., assignor to American Cyanamid Company, Stamford, Conn., a corporation of Maine
No Drawing. Filed July 15, 1968, Ser. No. 744,694
Int. Cl. C07d 93/44
U.S. Cl. 260—239.3          8 Claims

ABSTRACT OF THE DISCLOSURE

This disclosure describes compounds of the class of 1,4-dialkyl - 2,5 - piperazinedione-3,6-dithioacetates, -dithiols, -disulfides and -tetrasulfides useful an antifungal and antiviral agents.

BRIEF SUMMARY OF THE INVENTION

This invention relates to new organic compounds and, more particularly, is concerned with novel 1,4-dialkyl-2,5-piperazinedione-3,6-dithioacetates, 1,4 - dialkyl-2,5-piperazinedione-3,6-dithiols, 1,4-dialkyl-2,5-piperazinedione-3,6-disulfides and 1,4-dialkyl-2,5-piperazinedione-3,6-tetrasulfides and with methods of preparing these compounds. The novel compounds of the present invention may be represented by the following general formulae:

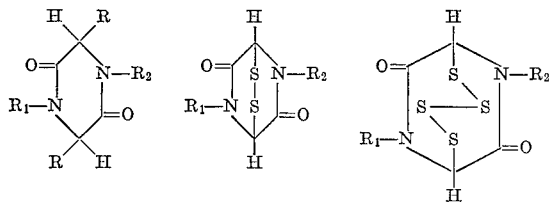

wherein R is thioacetyl (—SCOCH$_3$) or thiol (—SH), R$_1$ is lower alkyl and R$_2$ is lower alkyl. Suitable lower alkyl groups contemplated by the present invention are those having up to four carbon atoms such as, for example, methyl, ethyl, n-propyl, isopropyl, n-butyl, etc. Typical compounds of the present invention represented by the above general formulae are, for example, 1-methyl-4-isopropyl-2,5-piperazinedione-3,6-dithioacetate,
1,4-diethyl-2,5-piperazinedione-3,6-dithioacetate,
1-ethyl-4-n-propyl-2,5-piperazinedione-3,6-dithiol,
1-methyl-4-ethyl-2,5-piperazinedione-3,6-dithiol,
1-ethyl-4-isobutyl-2,5-piperazinedione-3,6-disulfide,
1-ethyl-4-isopropyl-2,5-piperazinedione-3,6-disulfide,
1,4-diisopropyl-2,5-piperazinedione-3,6-tetrasulfide and
1-methyl-4-n-butyl-2,5-piperazinedione-3,6-tetrasulfide.

DETAILED DESCRIPTION OF THE INVENTION

The novel compounds of the present invention are generally obtainable as white or pale yellow crystalline materials having characteristic melting points and absorption spectra and appreciable solubility in organic solvents such as acetonitrile, chloroform, and dimethylsulfoxide.

The novel compounds of the present invention may be readily prepared from an appropriately substituted 2,5-piperazinedione (I) as illustrated in the following reaction scheme:

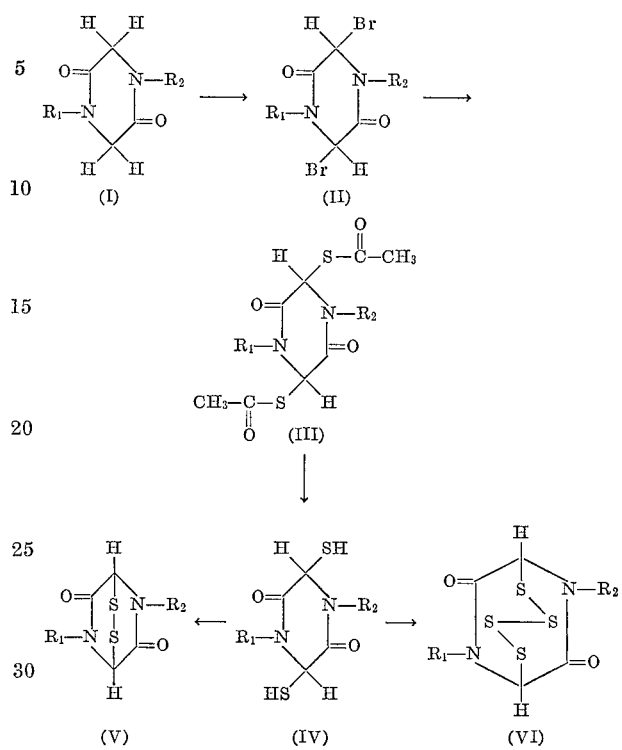

wherein R$_1$ and R$_2$ are as hereinabove defined. In accordance with the above reaction scheme an appropriately substituted 2,5-piperazinedione (I) is brominated at the 3 and 6 positions using bromine and a suitable solvent such as o-dichlorobenzene. Heating the reaction mixture to about 150° C. facilitates the bromination and the use of lower temperatures necessitates longer reaction times. The product can be purified by repeated recrystallizations using standard techniques. Treatment of the 2,5-piperazinedione-3,6-dibromide (II) with an excess of potassium thioacetate yields the corresponding 3,6-dithioacetate product (III). In this reaction potassium thioacetate, dissolved in a suitable solvent such as a lower alkanol, is cooled to approximately 0° C. and added slowly to a stirred and cooled solution of the 3,6-dibromide (II) in a suitable solvent such as chloroform. Elevated temperatures must be avoided in order to obtain high yields of the cis form of the 3,6-dithioacetate product (III), which is the only isomer that undergoes subsequent transformation to the disulfide and tetrasulfide. Elevated temperatures result in the production of the trans isomers of the corresponding 3,6-dithioacetates (III). The solvents are evaporated from the reaction mixture and water is added. The crude 3,6-dithioacetate product (III) is extracted with chloroform and purified by repeated recrystallizations. The so obtained 3,6-dithioacetates (III) are converted to the corresponding 3,6-dithiols (IV) by refluxing with ethanolic hydrogen chloride. Ordinarily a period of about 15 to 45 minutes is sufficient to effect the conversion and the crude product is purified by repeated recrystallizations. The 2,5 - piperazinedione-3,6-dithiols (IV) are converted to the corresponding 2,5-piperazinedione-3,6-disulfides (V) by dissolving in water and slowly adding a solution of 5,5'-dithiobis-(2-nitrobenzoic) acid in methyl alcohol. The pH of the reaction mixture is maintained at about 4 by the simultaneous addition of small increments of aqueous sodium hydroxide. The 3,6-disulfide product (V) is extracted from the reaction mixture with chloroform and purified by repeated recrystallizations from suitable solvents. Inasmuch as this conversion is essentially an oxidation reaction, other oxidizing procedures such as bubbling air or oxygen through a solution of the 3,6-dithiols (IV) at pH 2 may also be used to produce the corresponding 3,6-disulfides (V). The 2,5-piperazinedione-3,6-dithiols (IV) may be converted to the corresponding 2,5-piperazinedione-3,6-tetrasulfides (VI) by bubbling air for about 2.5 to 4 hours through an aqueous solution of the 3,6-dithiol (IV) buffered at about pH 7.5 with any commonly used buffers. A mixture of N-(2-hydroxyethyl)-piperazine-N'-2-ethane sulfonic acid and its sodium salt or a mixture of monobasic and dibasic sodium phosphate have been found to be useful for this purpose. Also, the presence of trace amounts of ferric chloride, cupric sulfate or o-phenanthroline expedite this conversion. The 3,6-tetrasulfide product (VI) precipitates and is extracted into chloroform. On recovery from the chloroform and subsequent recrystallization, the purified colorless product is obtained.

The novel compounds of the present invention are biologically active and have been found to possess antifungal activity. The antifungal spectrum of the compounds of this invention, representing the amount required to inhibit the growth of various typical fungi, was determined in a standard manner by the agar dilution streak technique as follows. In the assay, various concentrations of test compound are made up in 10 milliliter portions of fluid nutrient agar. These dilutions are then poured into petri dishes and hardened. Spore suspensions of the test organisms are streaked on the agar surfaces, and the plates are suitably incubated and then read. By way of illustration, the minimal inhibitory concentrations, expressed in micrograms per milliliter, of 1,4-dimethyl-2,5-piperazinedione-3,6-tetrasulfide against various test organisms as set forth in Table I below:

TABLE I

Organism:      Minimal inhibitory conc. mcg./ml.
Candida albicans 300 (E83)------------------ 50
Cryptococcus neoformans SP (E138)--------- 10
Trichophyton tonsurans NIH 662 (E10)------ 5
Trichophyton mentagrophytes (E11)--------- 5
Trichophyton rubrum (E97)------------------ 5
Microsporum canis ATCC 10214------------- 5
Microsporum gypseum ATCC 14683--------- 5
Phialophthora jeanselmei NIH 8724 (E16)---- 100

The novel compounds of the present invention are active against a broad range of RNA viruses including strains of rhino-, polio-, and Coxsackie viruses. The compounds of this invention were found to be active against various rhinoviruses when tested in cell cultures. The criteria for determining activity was the inhibition of cytopathic effects produced by the virus. The testing procedure used in connection with rhinoviruses, the causative agents of the common cold in man, was carried out essentially as follows. Monolayers of human embryonic lung cells, Wistar Institute (WI-38), in tubes containing 1.8 ml. of Earle's lactabumin hydrolysate medium supplemented with 2% calf serum were used as tissue culture systems. Viruses used in the testing program included Rhinovirus strain 2060, ATCC VR242; Rhinovirus strain 1734, ATCC VR285; Rhinovirus strain HGP-5; Rhinovirus strain 1059 and Rhinovirus strain 1200. Test compounds were dissolved or suspended in Earle's lactalbumin hydroylsate medium. Each compound was ordinarily tested in duplicate or triplicate. In a representative operation, and merely by way of illustration, the results obtained in the above test with four typical compounds of the present invention are set forth in Table II below:

TABLE II

| Compound | Minimal inhibitory concentration, mcg./ml. against Rhinovirus | | | | |
|---|---|---|---|---|---|
| | 1200 | 2060 | 1059 | HGP-5 | 1734 |
| 1,4-dimethyl-2,5-piperazinedione-3,6-dithioacetate | | 0.5 | | 0.25 | |
| 1,4-dimethyl-2,5-pepirazinedione-3,6-dithiol | | 2.0 | | | |
| 1,4-dimethyl-2,5-piperazinedione-3,6-disulfide | 0.06 | | <0.06 | <0.06 | 0.06 |
| 1,4-dimethyl-2,5-piperazinedione-3,6-tetrasulfide | 0.015 | 0.13 | | 0.13 | 0.13 |

The compounds of this invention were found to be active against Coxsackie A21 (Coe) virus when tested according to the procedure described by Trown et al., Proc. 5th Intl. Congress for Chemotherapy, vol. A II/4, p. 7 (1967). In this test the compounds are tested for their ability to inhibit viral RNA synthesis and the results are expressed as the minimum concentration in micrograms per milliliter required to achieve 50% inhibition. In a representative operation, and merely by way of illustration, the results obtained in the above test with four typical compounds of the present invention are set forth in Table III below:

TABLE III

| Compound: | Minimal 50% inhibitory concentration mcg./ml. |
|---|---|
| 1,4-dimethyl-2,5-piperazine-dione-3,6-dithioacetate | 0.02 |
| 1,4-dimethyl-2,5-piperazine-dione-3,6-dithiol | 0.0003 |
| 1,4-dimethyl-2,5-piperazine-dione-3,6-disulfide | 0.00008 |
| 1,4-dimethyl-2,5-piperazine-dione-3,6-tetrasulfide | 0.001 |

The invention will be described in greater detail in conjunction with the following specific examples.

EXAMPLE 1

Preparation of 1,4-dimethyl-2,5-piperazinedione-3,6-dibromide 32 grams of bromine dissolved in 200 milliliters of o-dichlorobenzene was added dropwise over a period of about 1 hour to a solution of 14.2 grams of 1,4-dimethyl-2,5-piperazinedione in 200 milliliters of o-dichlorobenzene. A yellow precipitate which forms almost immediately later dissolves with the evolution of hydrogen bromide gas. The reaction mixture was heated to about 150° C. and stirring was continued until the evolution of gas ceased. The mixture was then cooled and added to 2 liters of petroleum ether (B.P. 40–60° C.) and a pale yellow, crystalline product was deposited. The mixture was allowed to stand overnight at about 4° C. after which time the crystals were separated by filtration, washed with petroleum ether and dried; 26.8 grams of product was obtained. On recrystallization of the product from chloroform and diethyl ether, 20.8 grams of the purified product was obtained. Three additional recrystallizations from chloroform-ether yielded the desired product as colorless needles, M.P. 139–143° C.

EXAMPLE 2

Preparation of 1,4-dimethyl-2,5-piperazinedione-3,6-dithioacetate 3.12 grams of potassium thioacetate dissolved in 62 milliliters of ethanol was added dropwise over a period of about 1 hour to a solution of 2.73 grams of 1,4-dimethyl-2,5-piperazinedione-3,6-dibromide in chloroform. The mixture was stirred and cooled in ice. A white precipitate formed immediately. The mixture was stirred for 1 hour after completion of the addition after which time the solvents were removed using a rotary evaporator and bath temperature of 35° C. Water (100 milliliters) and chloroform (100 milliliters) were added to the residue and the layers were separated. The aqueous layer was subsequently extracted with two additional portions of chloroform. The chloroform extracts were combined and evaporated to a crystalline residue; weight 2.51 grams. Repeated recrystallizations from methanol yielded the purified product, M.P. 205.5–208° C.

EXAMPLE 3

Preparation of 1,4-dimethyl-2,5-piperazinedione-3,6-dithiol 1,4-dimethyl-2,5-piperazinedione-3,6-dithioacetate, 1.24 grams, was refluxed in 1.0 N ethanolic hydrogen chloride for about 20 minutes. Evaporation of the solvent yielded a white crystalline material (weight 923 milligrams) which was recrystallized from ethanol. Two additional recrystallizations from ethanol yielded the purified product as colorless needles, M.P. 111–114° C.

EXAMPLE 4

Preparation of 1,4-dimethyl-2,5-piperazinedione-3,6-disulfide 160 milligrams of 1,4-dimethyl-2,5 - piperazinedione-3,6-dithiol was dissolved in 80 milliliters of water. 320 milligrams of 5,5′-dithiobis-(2 - nitrobenzoic) acid dissolved in 40 milliliters of methanol was added dropwise with stirring over a period of one hour. The pH of the reaction mixture was maintained at about 4 throughout by addition of aqueous sodium hydroxide. The resultant bright yellow solution was extracted with chloroform (5× 100 milliliters). The extracts were combined, dried and evaporated to dryness, yielding 200 milligrams of pale yellow solids. The solids were dissolved in about 50 milliliters of chloroform and the chloroform was back-extracted with 10 milliliters of pH 7.5 buffer comprising a mixture of N-(2 - hydroxyethyl)piperazine - N′ - 2-ethane sulfonic acid and its sodium salt, 0.01 M. The chloroform layer was dried and evaporated, yielding 122 milligrams of pale yellow solids. Two recrystallizations from ethanol and two further recrystallizations from chloroform-hexane (about 1:1) yielded the purified disulfide as pale yellow needles, M.P. 206–207° C. (dec.).

EXAMPLE 5

Preparation of 1,4-dimethyl-2,5-piperazinedione-3,6-tetrasulfide 200 milligrams of 1,4-dimethyl - 2,5 - piperazinedione-3,6-dithiol was dissolved in 100 milliliters of pH 7.5 buffer comprising a mixture of N-(2-hydroxyethyl)piperazine-N′-2-ethane sulfonic acid and its sodium salt, total concentration equal to 0.01 M, and $10^{-8}$ M cupric sulfate and $10^{-5}$ M o-phenanthroline. Air was bubbled through the solution at room temperature. After a period of about 3 hours the solution rapidly changed to a yellow color and colorless crystalline material was formed. The mixture was extracted with chloroform (3× 100 milliliters) and the combined extracts were evaporated to dryness. The white crystalline residue was recrystallized from chloroform yielding 49 milligrams of the purified product as colorless prisms, M.P. 232–237° C. (dec.).

What is claimed is:
1. A compound selected from the group consisting of those of the formulae:

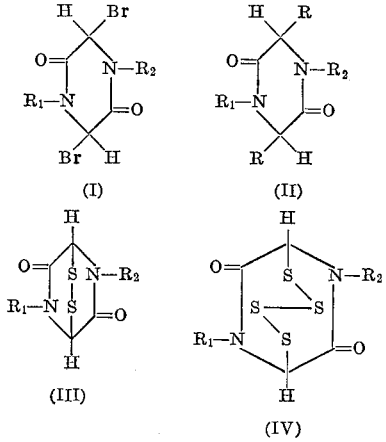

wherein R is selected from the group consisting of thioacetyl and thiol, $R_1$ is lower alkyl and $R_2$ is lower alkyl.

2. A compound according to claim 1, Formula I, wherein $R_1$ is methyl and $R_2$ is methyl.
3. A compound according to claim 1, Formula II, wherein R is thioacetyl, $R_1$ is methyl and $R_2$ is methyl.
4. A compound according to claim 1, Formula II, wherein R is thiol, $R_1$ is methyl and $R_2$ is methyl.
5. A compound according to claim 1, Formula III, wherein $R_1$ is methyl and $R_2$ is methyl.
6. A compound according to claim 1, Formula III, wherein $R_1$ is ethyl and $R_2$ is ethyl.
7. A compound according to claim 1, Formula IV, wherein $R_1$ is methyl and $R_2$ is methyl.
8. A compound according to claim 1, Formula IV, wherein $R_1$ is ethyl and $R_2$ is ethyl.

References Cited

UNITED STATES PATENTS 2,785,159    3/1957    Hoffmann et al. ____ 260—239.3

HENRY R. JILES, Primary Examiner

R. T. BOND, Assistant Examiner

U.S. Cl. X.R.

260—243, 268; 424—244, 246, 250